June 21, 1949. R. G. LE TOURNEAU 2,474,057
ENDLESS TRACK
Filed Jan. 26, 1944 4 Sheets-Sheet 2

INVENTOR
R. G. LeTourneau
BY
ATTYS

June 21, 1949.  R. G. LE TOURNEAU  2,474,057
ENDLESS TRACK
Filed Jan. 26, 1944  4 Sheets-Sheet 3

INVENTOR
R. G. Le Tourneau
BY
ATTYS

June 21, 1949.  R. G. LE TOURNEAU  2,474,057
ENDLESS TRACK
Filed Jan. 26, 1944  4 Sheets-Sheet 4
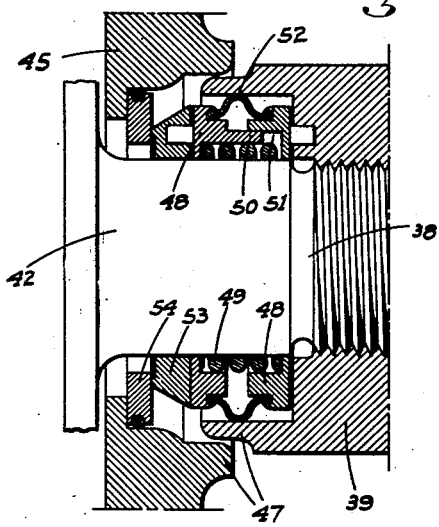
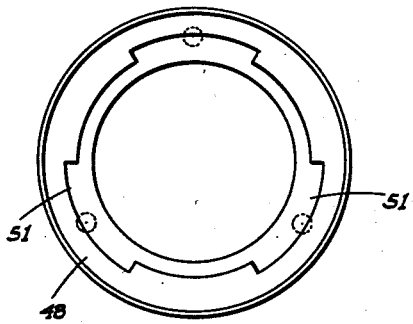
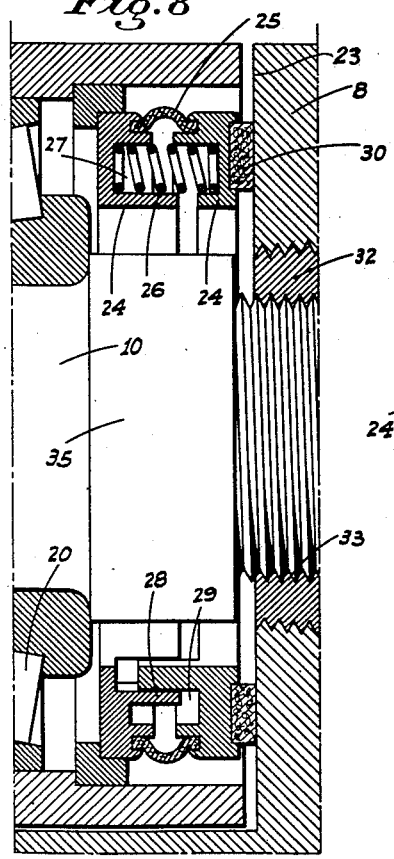
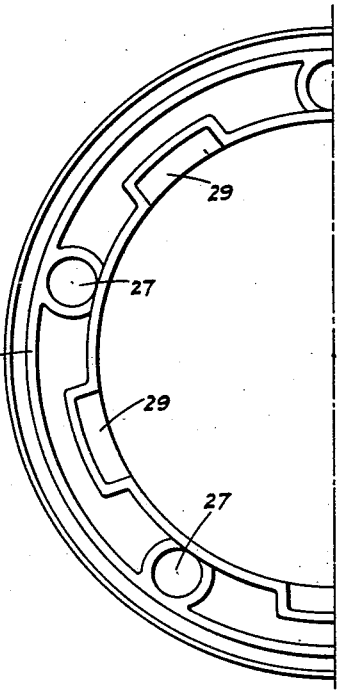
INVENTOR
R. G. LeTourneau
BY
ATTYS Patented June 21, 1949

2,474,057

UNITED STATES PATENT OFFICE 2,474,057

ENDLESS TRACK

Robert G. Le Tourneau, Peoria, Ill., assignor to R. G. Le Tourneau, Inc., Stockton, Calif., a corporation of California Application January 26, 1944, Serial No. 519,753

3 Claims. (Cl. 305—10)

1

This invention is directed to improvements in a link type endless track for tractors and the like.

One object of the present invention is to provide a link type endless track which includes, in unique assembly, anti-friction bearing units for the link pins, and idler roller shafts, and novel means to seal the bearing units against entry of foreign substance, whereby to assure of smooth running and long life of the track.

A further object of the invention is to provide a link type endless track, as above, which includes improved means for adjusting the bearing units for the link pins and idler roller shafts.

An additional object of the invention is to provide a link type endless track in which the pivotally connected links are formed so that the upper run of the track cannot sag; the coupled links being incapable of lowering movement at adjacent ends beyond dead center, whereby the track does not require idler rollers to support said upper run.

It is also an object to construct the track with links each formed with an inwardly opening pocket intermediate its ends, the track supporting idler and drive sprockets having radially projecting lugs which engage in said pockets.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views;

Figure 6 is an enlarged fragmentary sectional elevation of the sealing means for each idler roller shaft.

Figure 7 is an end elevation of the female member, detached, of said sealing means.

Figure 8 is an enlarged, fragmentary sectional elevation of the sealing means for each link pin.

Figure 9 is a fragmentary end elevation of the female member, detached, of said sealing means.

Figure 1:
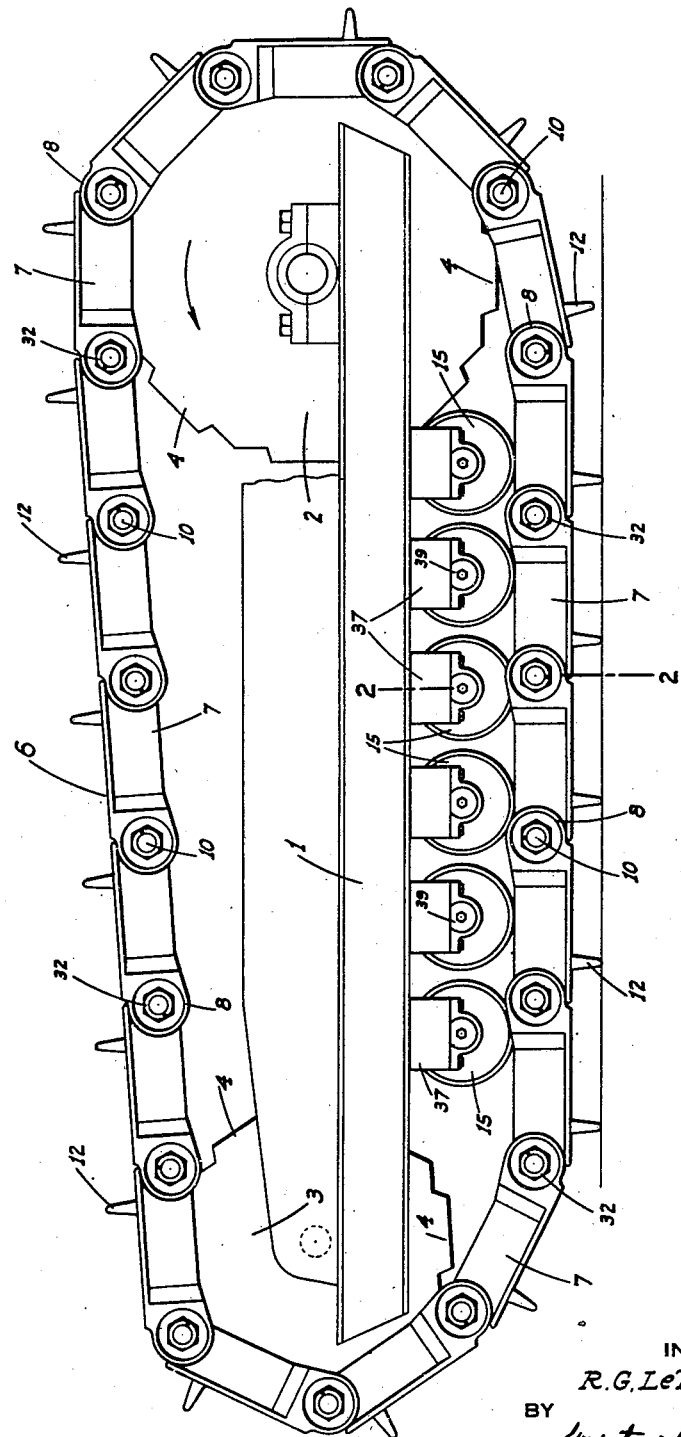
Figure 1 is a side elevation of the track.

Referring now more particularly to the characters of reference on the drawings, the numeral 1 indicates the track frame which is substantially of conventional construction; the track frame being connected to the tractor in the usual manner.

2

Such track frame supports, adjacent its ends, a driving sprocket 2 and an idler sprocket 3; the driving sprocket 2 being octagonal and of somewhat greater diameter than the idler sprocket 3, which is hexagonal. The sprockets 2 and 3 are each formed with track line engaging lugs 4, one lug projecting radially from each side of the sprockets intermediate its ends. While elongated, the lugs 4 are shorter than the corresponding sides of said sprockets.

An endless track, indicated generally at 6, extends about and is supported in driven relation by sprockets 2 and 3; such track being constructed as follows:

The track includes a plurality of links 7 which are hollow and preferably of cast steel construction, being suitably internally reinforced. The links are generally rectangular in plan and are identical to each other. Each link 7 is formed at one end with a pair of generally circular, longitudinally extending ears 8 which project outwardly in transversely spaced, facing relation from the corners of the link. At the opposite and trailing end of each link the same is formed adjacent the corners with a pair of outwardly opening, annularly recessed bosses 9; the spacing of the bosses 9 being less than that of ears 8 so that such bosses, which are formed to match said ears, can engage closely and in matching relation between the ears of the next adjacent link 7. The links are pivotally connected together at adjacent ends by cross or link pins 10, and bearing units, indicated generally at 11, which will hereinafter be described in detail.

Transverse traction cleats 12 are formed on and project outwardly from each link adjacent its trailing end, and each link is formed on its radially inner side with a flat surface having a substantially centrally disposed opening or socket 13 therein for the reception of lugs 4 of the sprockets 2 and 3. An escape opening 14 for earth which may enter through socket 13 is formed in the outside of each link in matching relation to said socket. The sprockets 2 and 3 are formed so that when the lugs are engaged in sockets 13, the adjacent flat faces of the sprockets engage the link surfaces S, and thus prevent teetering of the links.

Figure 2:
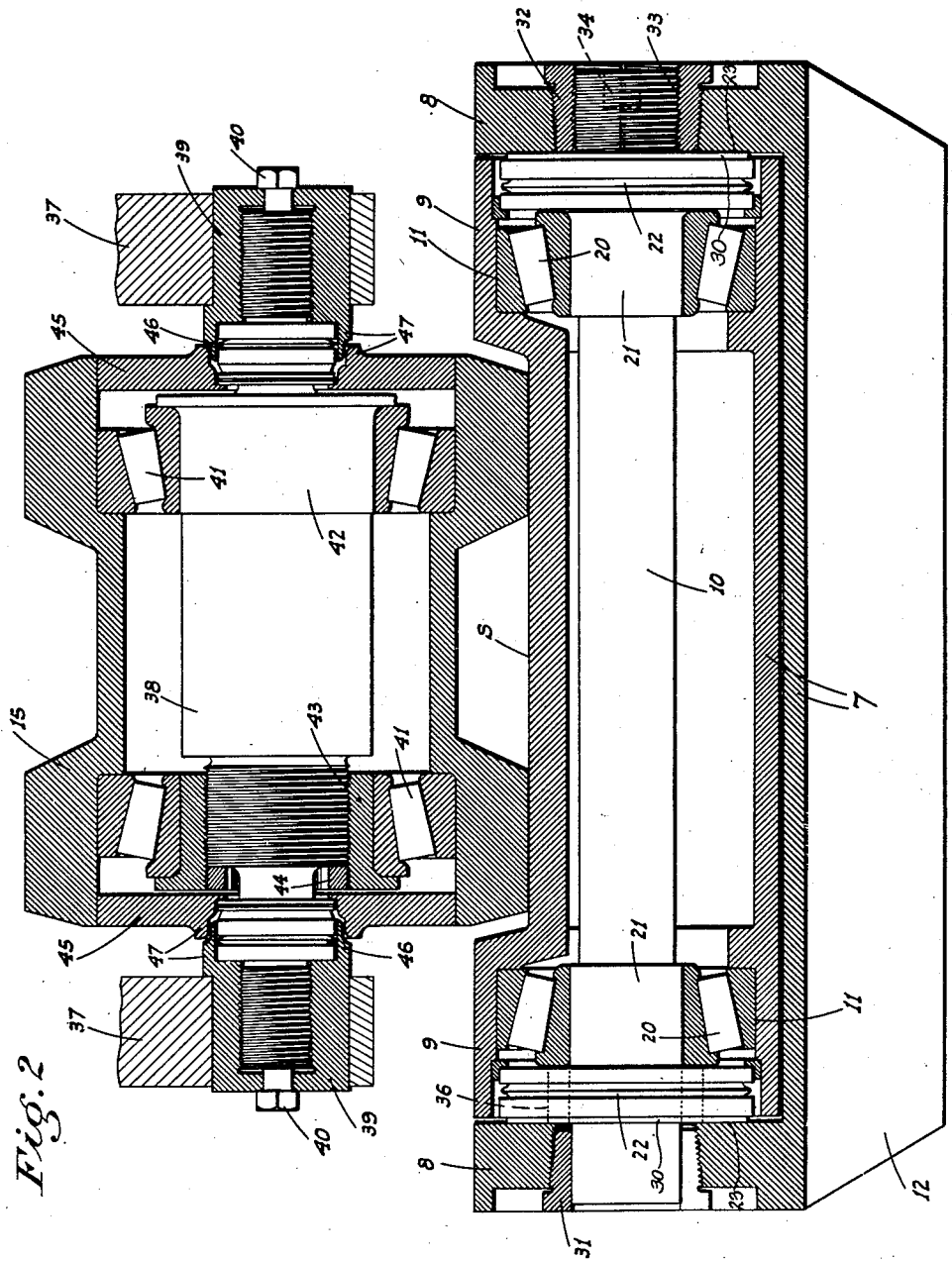
Figure 2 is an enlarged cross section on line 2—2 of Fig. 1.
Figure 3:
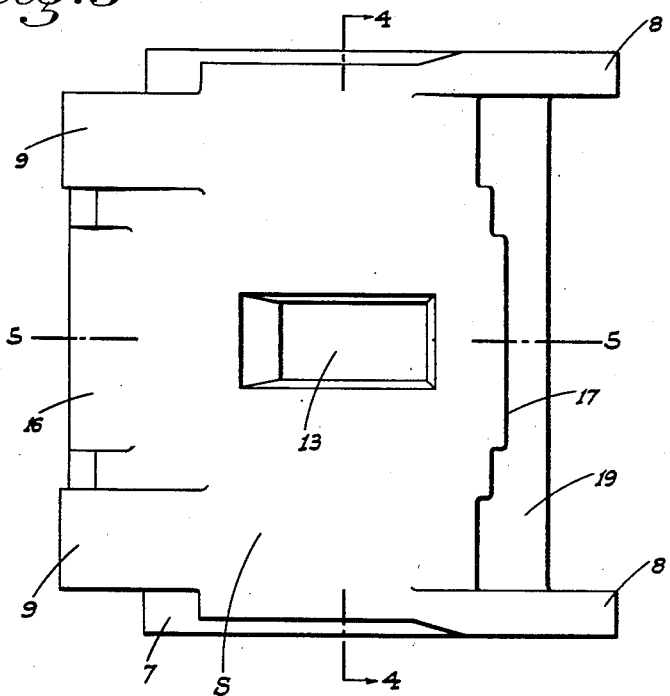
Figure 3 is a plan view of one link, detached.
Figure 4:
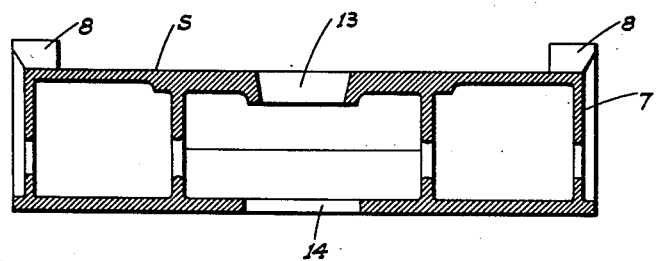
Figure 4 is a cross section on line 4—4 of Fig. 3.
Figure 5:
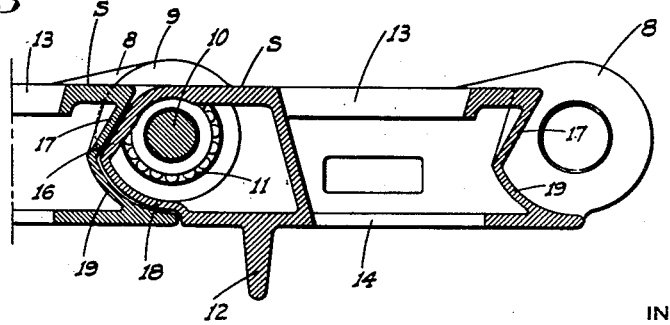
Figure 5 is a cross section on line 5—5 of Fig. 3.

A plurality of idler rollers 15 are journaled on and depend from the under side of frame 1 in closely spaced relation, such rollers riding the top side of the lower run of the track to maintain the same rigid against upward deflection; said rollers riding the links between the bosses 9, as clearly shown in Fig. 2. The bearing units for each roller 15 will hereinafter be described in detail.

The top run of the track is maintained rigid against downward deflection or sagging by the following cooperating parts of the links 7 at adjacent ends thereof.

Each link at one end is formed with a transverse shoulder 16 which extends between the bosses 9; said shoulder, when the link is in the upper run of the track, slopes from the inner side of the link upwardly in diverging relation to the axis of the adjacent and corresponding link pin 10. The adjacent end of the next link is formed between the ears 8 with a matching shoulder 17 against which the shoulder 16 of each link abuts when the links are in said upper run of the track, whereby to limit relative downward pivotal movement of adjacent end portions of the links, and consequently prevent sagging of said upper run.

The adjacent ends of the links are formed between shoulders 16 and 17 and the outside of said links with matching end portions 18 and 19 which are transversely arcuate and concentric to the adjacent and corresponding pivot pin 10.

Each link is identical in construction, as is apparent, and as above described are formed for interchangeable end to end connection.

The bearing unit 11 for each pivot pin 10 comprises the following:

A combination annular and thrust bearing 20 of "Timken" type is seated in each of the recessed bosses 9, and the pivot pin 10 is enlarged, as at 21, to receive and support the inner race of the corresponding bearing 20. The boss recesses are of greater depth than the axial extent of bearings 20, and a sealing unit 22 is seated in each boss recess outwardly of the bearing. These sealing units 22 are axially expansible, bellows type and comprise—in surrounding relation to pin 10 and between the bearing 20 and adjacent face 23 of the corresponding ear—a pair of annular rings 24 connected adjacent their periphery by an annular flexible bellows 25, and urged in a separating direction by compression springs 26 seated in opposed sockets 27 in said rings, the latter being held against relative rotation by fingers 28 on one ring engaging in notches 29 in the other ring. The outermost ring 24 includes an annular leather seal 30 which frictionally engages face 23 in sealing relation.

At the ends each pivot pin projects from the corresponding boss 9 into the adjacent ear 8, and split nuts 31 and 32 are threaded, on a taper, into said ears in surrounding relation to the end portions of said pin whereby when said split nuts are tightened the pin is clamped against rotation. The pin is threaded into nut 32, as at 33, and to adjust the bearings 20 the nut 32 is loosened and a socket wrench is inserted in an axial socket 34 in the end of the pin 10. The pin can then be rotated so as to either tighten or loosen the bearings 20 between a shoulder 35 formed on the pin outwardly of one bearing and a fixed sleeve 36 of the other bearing. The nut is then retightened, which has no effect on the bearing adjustment, as the threads on the inside and outside of nut 32 are matching and of the same pitch.

The idler rollers 15 are journaled in connection with the frame 1 in the following manner:

A split supporting block 37 depends from frame 1 beyond each end of the rollers, and a roller shaft 38 extends axially through and beyond opposite ends of each roller. At its ends each roller shaft 38 is threaded into an inwardly opening cup 39 which is clamped into the corresponding split block 37; one side of each cup and a matching portion of the block being flat to prevent rotation of the cup. The shaft 38 is normally secured against rotation in the cups 39 by cap screws 40 threaded into the ends of said shaft and seating against the ends of the cup.

Opposed combination annular and thrust bearings 41 are seated in each roller adjacent its ends; one of said bearings 41 being carried on an outwardly shouldered portion 42 of shaft 38, while the other bearing 41 is carried on an outwardly shouldered adjustment nut 43 threaded on the shaft and normally held against relative rotation by an internal locking ring 44 threaded in said nut 43 and abutting an adjacent shoulder of shaft 38.

Adjustment of bearings 41 is accomplished by loosening locking ring 44 and then rotating the adjustment nut 43. Access to nut 43 and ring 44 is had by means of a removable end head 45 in the roller.

A bellows type sealing unit, indicated generally at 46, is disposed about shaft 38 between each cup 39 and adjacent end head 45; said cup and head having overlapping annular skirts 47 radially out from said sealing unit. Each sealing unit 46 comprises a pair of annular rings 48 disposed in facing relation and urged apart by a compression spring 49 therebetween and surround the shaft 38. Fingers 50 project from one ring 48 into notches 51 in the other ring and prevent relative rotation therebetween without limiting relative axial movement.

An annular flexible bellows 52 connects the ring 48 radially out from fingers 50. At its outer end each sealing unit 46 seats in the adjacent cup 39, while at its inner end such unit includes a sealing ring 53 which runs in end to end engagement with a matching ring 54 mounted in the corresponding end head 45. Access to the sealing units 46 is had by removing the cups 39.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A track unit comprising an endless track having a plurality of track links pivotally connected together at adjacent ends, spaced sprockets supporting the track and about which sprockets the track engages, and lugs projecting radially from the sprockets, the track links each having an inwardly opening socket therein intermediate its ends and into which sockets said lugs project as the track links ride said sprockets, and the sprockets having peripheral portions of substantial length which matchingly engage the radially inner face of the links immediately at the ends of the sockets.

2. A track unit comprising an endless track having a plurality of track links pivotally connected together at adjacent ends, spaced sprockets supporting the track and about which sprockets the track engages, and lugs projecting radially from the sprockets, the track links each having an inwardly opening socket therein intermediate its ends and into which sockets said lugs project as the track links ride said sprockets, and the sprockets having peripheral portions of substantial length which matchingly engage the radially inner face of the links immediately at the ends of the sockets, said peripheral portions being straight and in the same plane.

3. In a track unit which includes an endless track supported and engaged by spaced sprockets, said track comprising a plurality of track links pivoted together, shoulders on adjacent link ends, such shoulders being parallel to each other and sloping at an angle to the plane of the inner face of the track when the links are disposed horizontally between the sprockets, such shoulders terminating short of the opposite face of the links, the ends of the links beyond the shoulders forming extensions of such shoulders and both such extensions being of arcuate form and concentric with the longitudinal axis of the adjacent pivots between the links.

ROBERT G. LE TOURNEAU.

REFERENCES CITED

The following references are of record in the file of this patent:

UNITED STATES PATENTS

| Number | Name | Date |
| --- | --- | --- |
| 1,222,295 | Jett | Apr. 10, 1917 |
| 1,308,308 | Sullivan | July 1, 1919 |
| 1,450,471 | Wickersham | Apr. 3, 1923 |
| 1,542,715 | Owens | June 16, 1925 |
| 2,189,160 | Baker et al. | Feb. 6, 1940 |
| 2,329,901 | Herrington | Sept. 21, 1943 |
| 2,342,675 | Knox | Feb. 29, 1944 |